United States Patent
Shankar et al.

(10) Patent No.: US 9,369,530 B2
(45) Date of Patent: Jun. 14, 2016

(54) RESOURCE ADAPTER CAPABLE OF CONCURRENT ESTABLISHING OF PLURAL CONNECTIONS BETWEEN AN EXECUTIVE INFORMATION SYSTEM AND AT LEAST ONE CLIENT

(71) Applicant: SOFTWARE AG, Darmstadt (DE)

(72) Inventors: Satish Shankar, Bangalore (IN); Aditya Babu, Hyderabad (IN)

(73) Assignee: SOFTWARE AG, Darmstadt (DE)

( * ) Notice: Subject to any disclaimer, the term of this patent is extended or adjusted under 35 U.S.C. 154(b) by 557 days.

(21) Appl. No.: 13/726,848

(22) Filed: Dec. 26, 2012

(65) Prior Publication Data

US 2014/0019628 A1 Jan. 16, 2014

(30) Foreign Application Priority Data

Dec. 22, 2011 (IN) .......................... 1578/KOL/2011

(51) Int. Cl.
*G06F 13/00* (2006.01)
*H04L 29/08* (2006.01)
*G06F 9/54* (2006.01)

(52) U.S. Cl.
CPC .............. *H04L 67/141* (2013.01); *G06F 9/541* (2013.01)

(58) Field of Classification Search
CPC .............. H04L 29/06; H04L 29/08072; H04L 29/08576; H04L 29/0809; H04L 29/06537; H04L 12/5695; H04L 47/10; H04L 47/805; H04L 29/06027; H04L 29/06095; H04L 67/141; H04Q 11/0478; G06F 9/541
USPC .......................................... 709/206, 228, 227
See application file for complete search history.

(56) References Cited

U.S. PATENT DOCUMENTS

2007/0268910 A1* 11/2007 Shen ....................... H04L 67/14
370/395.21
2010/0268782 A1* 10/2010 Zombek et al. ............... 709/206
2011/0153581 A1   6/2011 Kass

FOREIGN PATENT DOCUMENTS

EP            2 363 806        9/2011
WO         2004/010260        1/2004

OTHER PUBLICATIONS

Phil Wakelin et al., "Integrating WebSphere Application Server and CICS using the J2EE Connector Architecture," IBM WebSphere Software, Jan. 31, 2006.
Haley Fung, "IMS TM Resource Adaptor," IBM, Jul. 16, 2009.
"Java EE Connector Architecture Specification Version 1.6", Sun Microsystems Inc., Nov. 2009, retrieved Oct. 31, 2012, 592 pages.

* cited by examiner

*Primary Examiner* — Robert B Harrell
(74) *Attorney, Agent, or Firm* — Nixon & Vanderhye, P.C.

(57) ABSTRACT

Certain example embodiments relate to a resource adapter configured to establish connections between an executive information system (EIS) and one or more clients. The resource adapter includes at least a first and a second connection pool, both maintaining a plurality of connection objects. Each connection object defines a channel of communication between the EIS and the resource adapter. A cluster coordinator is configured to assign a first connection object in a first connection pool and a second connection object in a second connection pool to the one or more clients to create at least two coexisting connections between the one or more clients and the EIS.

17 Claims, 5 Drawing Sheets

Figure 1:
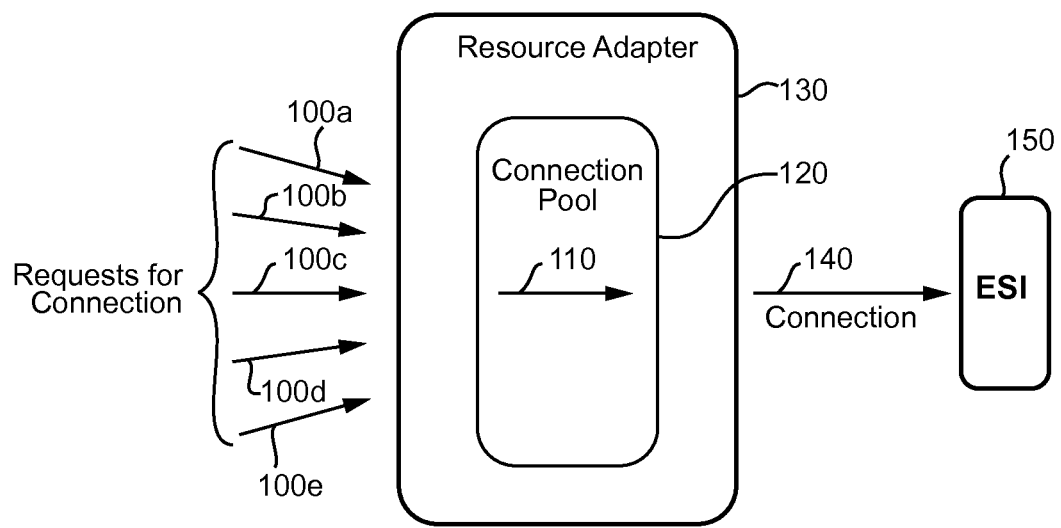

RESOURCE ADAPTER CAPABLE OF CONCURRENT ESTABLISHING OF PLURAL CONNECTIONS BETWEEN AN EXECUTIVE INFORMATION SYSTEM AND AT LEAST ONE CLIENT

This application claims priority to 1578/KOL/2011 filed Dec. 22, 2011, the entire contents of which hereby incorporated by reference.

1. TECHNICAL FIELD

Certain example embodiments of the present invention relate to a resource adapter for establishing a connection between an executive information system and at least one client.

2. TECHNICAL BACKGROUND AND SUMMARY

Large enterprises typically comprise a plurality of different departments, e.g., manufacturing, assembly, sales, accounting and so on. In order to provide executives of an enterprise with sufficient data for decision-making, the data of each of the departments has to be collected and prepared before it is presented to the executive. Typically, the respective departments are distributed over multiple locations which makes the task of acquiring relevant information and of determining the performance of each of the departments a challenge. This is even more the case since the complexity of the tasks of each department, e.g., monitoring sales of goods in a specific region, requires highly sophisticated and specific software. For instance, the accounting department uses specific software for calculating the balance sheet, while the manufacturing or the sales department may need completely different and special software.

However, executives, in particular senior executives, require versatile information from all departments of the enterprise in order to determine the performance of the enterprise or to derive trends and to compare them, e.g., to previously defined strategic goals of the enterprise.

Software that is specifically designed for acquiring, analyzing and displaying such data in order to support the executives in decision-making is commonly referred to as executive information system (EIS, cf. definition in Wikipedia). The executives could, e.g., use their client computer to access the EIS in order to retrieve the information from the EIS instead of retrieving information from various systems by themselves.

In addition to the above described complexity of acquiring information from various internal and external sources, an EIS system faces the further technical obstacle that software programs usually have a unique and not standardized interface for communication. Thus, establishing connections is very difficult.

To overcome this problem, the J2EE connector architecture (http://java.sun.com/developer/technicalArticles/J2EE/connectorclient/resourceadapter.html) has evolved as a de facto standard which many vendors have adopted for building a resource adapter. The resource adapter plays a central role in the integration and connectivity between an EIS, a client computer (e.g., the computer of the executive) and an application server. The client which intends to communicate with the EIS does so via the resource adapter. In other words, the resource adapter may be regarded as the mediator of the connection. The client accesses the EIS via the resource adapter. The resource adapter could be part of the application server which also hosts the EIS. However, all components could also be located in different systems. The resource adaptor generally uses a factory for the creation of connections in a connection pool. Moreover, it manages the lifecycle from the creation of a connection to making it available and to destroying any inactive/timed out connections. To achieve this, rather than creating a connection every time an operation has to be performed, the connection pool maintains the configuration information which is needed to connect the client to the EIS and creates a certain number of configurable connection objects beforehand so as to avoid the overhead of creating the same every time.

Hence, by maintaining the pool of connections, requests by clients and/or client applications for performing operations can be instantly triggered by using the connection objects already created in the connection pool. The connection objects return back to the connection pool once the operation is completed. When a new connection is needed, it is firstly checked whether there is any available connection object in the connection pool that can be used. If all known connections are occupied by other client requests, a new connection object can be created.

However, the J2EE Connector Architecture (JCA) allows to create, destroy or access only one connection at a time. FIG. 1 is an illustration of the mechanism as known from prior art. Multiple requests for connection boom to woe by one or more clients are waiting to be processed by the resource adapter 130. However, at a certain point in time only one connection request 110 is processed and may retrieve a connection object from the connection pool 120, while the other connections have to wait. This limitation causes a severe performance bottleneck when there are several processes (also referred to as threads) trying to obtain access to the connection pool 120 in order to subsequently establish a connection 140 with the EIS 150. This problem can be observed particularly during heavy load, e.g., when many clients try to connect to the EIS simultaneously, or when a single client tries to establish multiple connections to the EIS simultaneously, or if the connection creation takes a long time. As a consequence, threads pile up at the connection pool which has to reject more and more requests. The result may be a crash of the client application and/or the EIS, but also a crash of the connection pool. In this case, all connections of the connection pool have to be re-established which takes a long time.

The US patent application 2011/0153581 discloses virtual connection drivers that are created and maintained to connect to data sources. The proposed solution is specific to a database and comprises an application process requiring a connection to a database server which is provided by a driver providing a virtual database connection interface to the application. At any given point in time, only one thread has access to a pool comprising the connections.

It is therefore the technical problem underlying certain example embodiments of the present invention to improve the properties of the connector architecture so as to provide a faster, more stable and thus more efficient connection pooling for establishing connections between an executive information system and one or more clients.

In one embodiment, this problem is solved by a resource adapter configured to establish connections between an executive information system (EIS) and one or more clients, the resource adapter comprising:

a. at least a first and a second connection pool (240a-e, 320a-d) both maintaining a plurality of connection objects, wherein each connection object defines a channel of communication between the EIS (220) and the resource adapter (200); and
b. a cluster coordinator (230, 300) configured to assign a first connection object in a first connection pool (240a-e, 320a-d) and a second connection object in a second connection pool (240a-e, 320a-d) to the one or more clients (210) to create at least two coexisting connections between the one or more clients (210) and the EIS (220).

Such an embodiment allows to overcome the above mentioned disadvantages of the prior art at least in part. In more detail, by introducing a plurality of connection pools, a crash of a single connection pool does no longer require re-establishing all connections but only the connections of the respective pool. Moreover, the cluster coordinator selects the connection objects out of the plurality of connection pools which allows for an improved connection establishment. In more detail, the cluster coordinator may initiate more than one connection by using more than one connection pool at an instance of time. Thus, the cluster coordinator can handle multiple threads at a time which greatly increases the throughput, i.e., the establishment and the degradation of a connection. The connections need not be established at the same time. However, the connections exist at the same time.

Preferably, the resource adapter is configured to assign several connection objects to a single client (210).

Depending on the type of the client and information that is to be retrieved it may be necessary to establish multiple connections between the EIS and a certain client. This requires several connection objects each specifying distinct connection information for establishing a connection. For instance, when the client makes multiple requests to access the EIS via the resource adapter, the resource adapter facilitates each of these requests with a connection. The client then obtains the one or more connections from the resource adapter. As an illustrative example, a connection may be visualized as a kind of channel that is created and through which the two systems can communicate.

It is further preferred that the resource adapter comprises at least one cluster wherein each cluster comprises at least two connection pools.

This allows for an improved structure of the connection pools of the resource adapter. In this way, several connection pools could be grouped together, e.g., into clusters for different purposes. A first cluster could be used as main cluster, while a second cluster could be used as backup cluster. It is also possible to group connection objects relating to certain types of applications.

Preferably, the resource adapter comprises a connection pool health registry configured to monitor the status of at least one, preferably all of the connection pools.

Maintaining information about the status of the connection pools enables the resource adapter to select connection objects out of the available connection pools in an optimized manner. Moreover, the status may indicate that a certain connection pool is presently unavailable and therefore no request for connection object can be addressed to that connection pool. The information about the connection pools may also comprise details about the pool size, the number of available connections or whether the connection pool has no connection objects available. This avoids unnecessary requests to connection pools and improves the performance of the connection pooling.

It is further preferred that the status comprises information about available connection objects of the at least two connection pools.

The information about available connection objects comprises details about the connections that are presently available, e.g., the type of connection that could be created using a certain connection object. Further, the connection pool health registry may indicate that all available connection objects of a respective pool are presently not available or that a certain connection pool already processes several threads. As a result, another connection pool may be chosen. This allows for a more efficient selection of certain connection objects out of several connection pools.

Preferably, the resource adapter comprises a connection pool manager configured to create one more new connection objects in the at least two connection pools.

The connection pool manager is an entity which may handle the lifecycle of connection objects in the connection pool. For several reasons it may happen that a desired connection is not yet pre-defined. In this case, the connection pool manager may create a new connection object comprising connection information. The connection pool manager may select a suitable connection pool depending on certain parameters, e.g., whether there is space for another connection object, or depending on the load of a certain connection pool.

It is further preferred that a new connection object is created using a connection factory.

When the resource adapter creates a new connection object it may use a certain set of configuration parameters that has been defined in advance in the connection factory. This set could comprise any helpful connection information related to the connection itself such as originating IP or timeout parameters. Therefore, this feature improves the creation of a certain connection object.

Preferably, the connection pool manager is further configured to modify or delete connection objects in the at least two connection pools.

The connection information regarding a connection between the EIS and the resource adapter and/or client could change for various reasons. This may happen due to a reconfiguration of the client. In such cases the connection pool manager may modify an existing connection object or parts thereof. A certain connection object may also become useless. Instead of occupying a "slot" of the connection pool, the connection object can be deleted by the connection pool manager.

It is also preferred that the connection pool manager is further configured to update the connection pool health registry.

If the connection pool manager makes any changes to one or more connection pools such as creating, modifying or deleting connections, they can be announced to the connection pool health registry. Thus, in case of a connection request, the connection pool manager can simply query the connection pool health registry and retrieve information about the connection objects in one or more of the connection pools, wherein the information is always up to date.

Preferably, the connection pool manager is further configured to destroy inactive connections to release the corresponding connection objects.

It may happen that a connection object is unavailable because it was marked as being used by a connection. However, for some reasons, the connection may have timed out or not be used anymore without returning the connection object to the connection pool. In this case, the connection pool manager may destroy inactive connections. As a result connection objects can become available to other connections again. Thus, the availability of connections can be increased. Furthermore, it has to be noted that an inactive connection could result in a crash which would require to restart the connection pool. By destroying such inactive connection prior to such a crash the stability of the resource adapter can be improved.

Another embodiment relates to a method for establishing a connection between an executive information system, EIS (220), and at least one client (210), the method comprising the following steps:
a. providing at least a first and a second connection pool (240a-e, 320a-d) both maintaining a plurality of connection objects, wherein each connection object defines a channel of communication between the EIS (220) and the resource adapter (200); and
b. providing a cluster coordinator (230, 300) assigning a first connection object in a first connection pool (240a-e, 320a-d) and a second connection object in a second connection pool (240a-e, 320a-d) to the one or more clients (210) to create at least two coexisting connections between the one or more clients (210) and the EIS (220).

Further dependent claims are defined in the detailed description.

3. SHORT DESCRIPTION OF THE FIGURES

Figure 2:
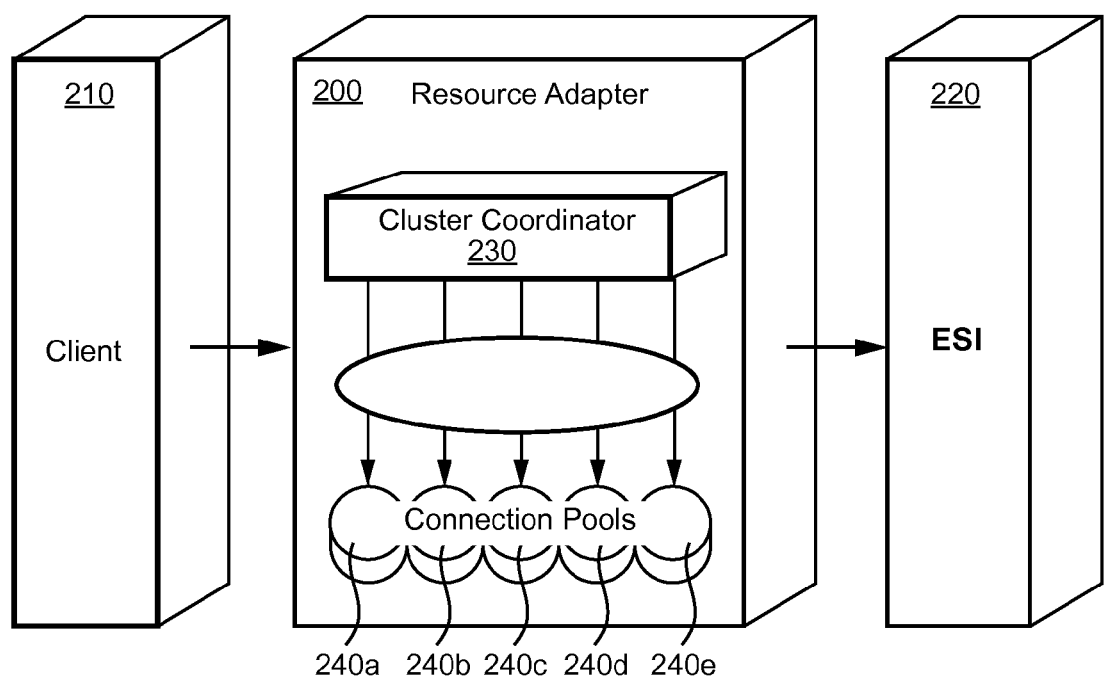
Figure 3:
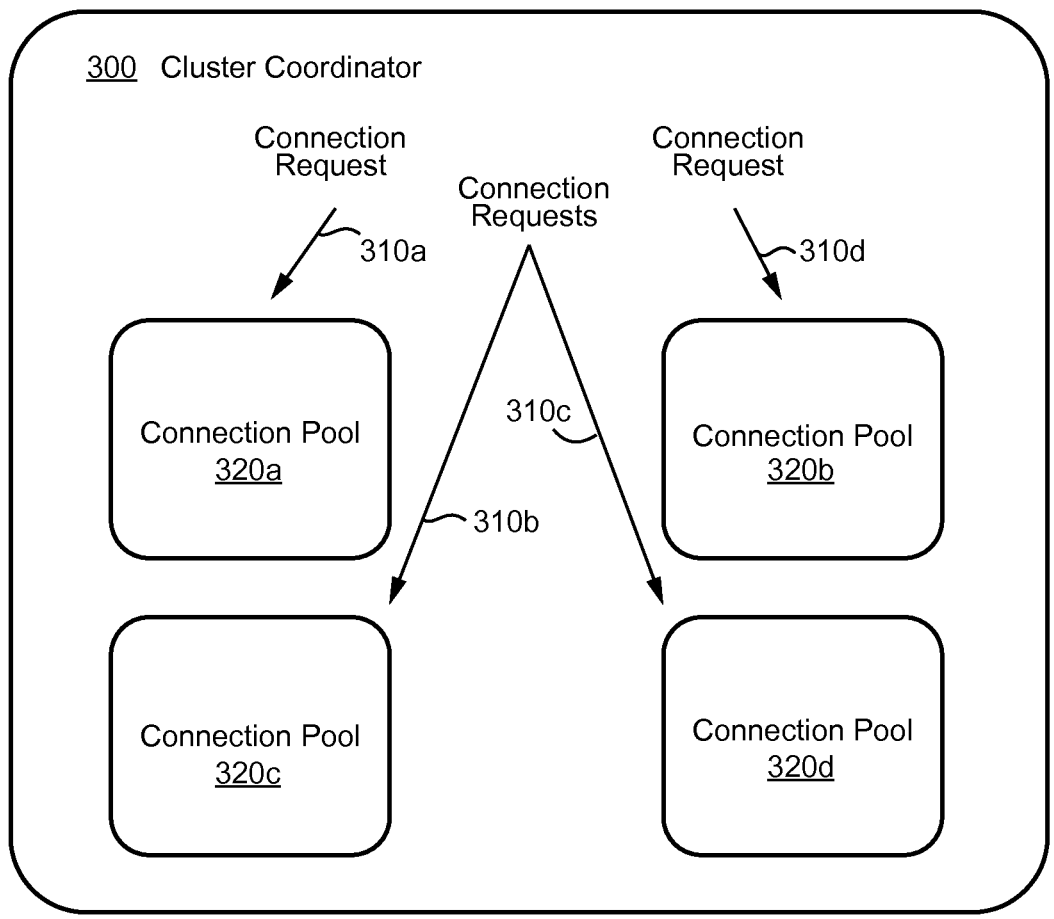
Figure 4:
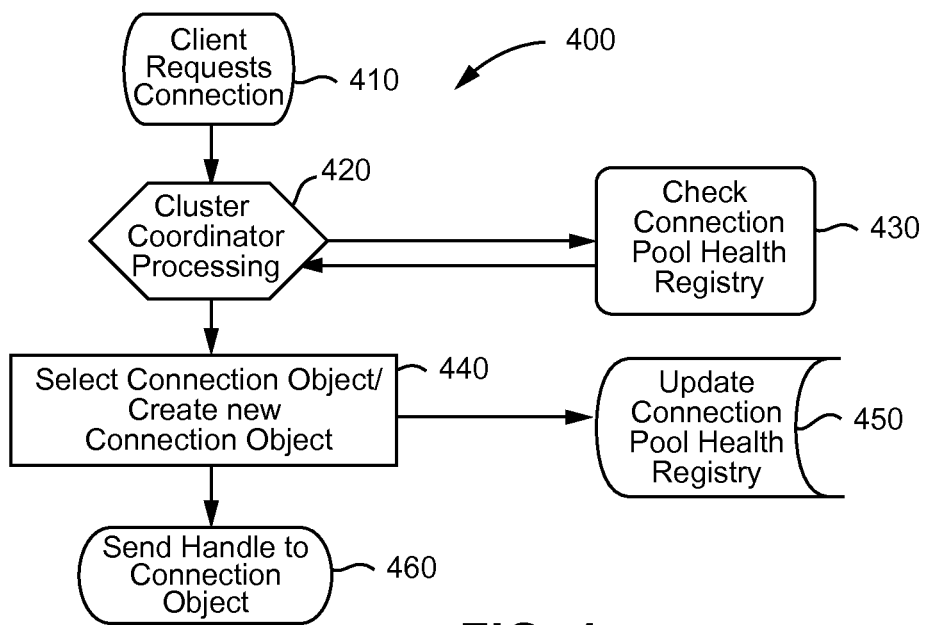
Figure 5:
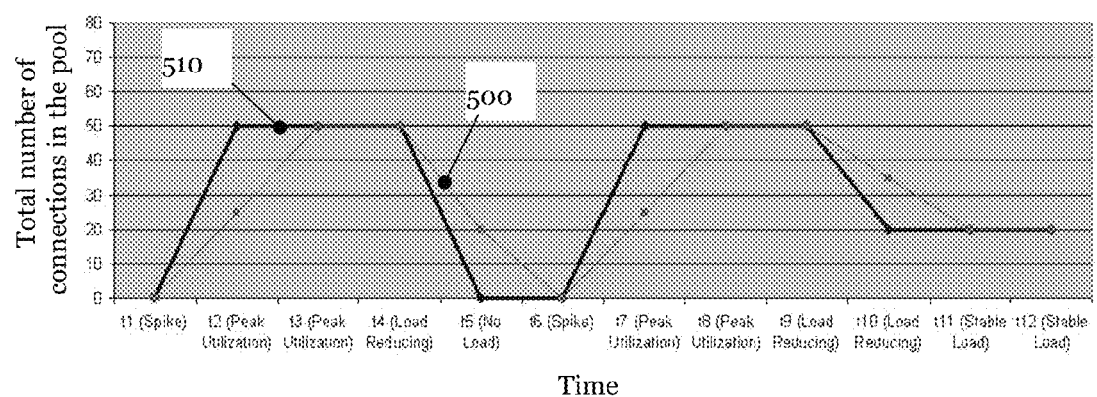

In the following detailed description, presently preferred embodiments of the invention are further described with reference to the following figures, wherein:

FIG. 1: illustrates the connection pooling according to prior art;

FIG. 2: illustrates the structure of the resource adapter and the client and the EIS in accordance with an embodiment of the present invention;

FIG. 3: illustrates the connection pool cluster coordinator and the connection pools in accordance with an embodiment of the present invention;

FIG. 4: illustrates a method for establishing a connection between an EIS and a client in accordance with an embodiment of the present invention; and FIG. 5: illustrates the behavior of a connection pool as known from the prior art and according to an embodiment of the present invention.

4. DETAILED DESCRIPTION OF THE FIGURES

As already explained above, an embodiment of the present invention allows to utilize at least two connection pools concurrently which optimizes the throughput and the efficiency of the resource adapter.

An embodiment of the resource adapter will now be described with reference to FIG. 2. This figure shows the client application 210, the EIS 220 and the resource adapter 200. The resource adapter 200 comprises the cluster coordinator 230 and a plurality of connection pools 240a to 240e. The role of the cluster coordinator 230 is to intercept all requests to the connection pools 240a to 240e and to orchestrate the whole process of creation, maintaining and optimising the availability of connections to an EIS 220 by using the multiple connection pools 240a to 240e. However, it is also conceivable to have one or more clusters, each comprising several connection pools 240a to 240e.

All of the connection pools 240a to 240e use the same configuration as defined in the connection factory. Connection factory in this context means a placeholder of the configuration information. A ConnectionFactory encapsulates a set of connection configuration parameters that has been defined, e.g., by an administrator. A client uses it to create a connection. The connection factory will be described in more detail further below. In sum the total pool statistics (e.g., minimum connection pool size, maximum connection pool size etc.) of all connection pools 240a to 240e is equal to the defined value in the connection factory. If at least some of the connection pools 240a to 240e are comprised in clusters, these parameters may apply to the connection pools of a cluster only or to all clusters together.

The steps involved to establish a connection according to the embodiment shown in FIG. 2 comprise the invocation of an API (application programming interface) of the cluster coordinator by the one or more client applications to procure the connection. Then, the cluster coordinator checks with the connection pool manager for the best feasible connection pool with optimum health statistics. This might improve the connection object determination and thus the efficiency. The connection object is fetched from the connection pool and the connection is created by the cluster coordinator. Then the connection is passed on to the requesting client application. The provided connection is the channel via which the service invocation is carried out.

With respect to the prior art solution discussed above, in high throughput scenarios, client applications requesting for connection objects will be waiting for a chance for a handle to the connection pool. In an embodiment of the present invention, due to the availability of multiple connection pools, or even one or more clusters of connection pools, and not only a single connection pool, procuring a handle to one of the connection pools is easier, faster and more reliable.

Each of the connection pools comprises certain parameters like block timeout, expire timeout, startup retry count and backoff timeout. The parameter block time out specifies the number of milliseconds that the resource adapter will wait to obtain a connection with the EIS before it times out and returns an error. The expire timeout parameter specifies the number of milliseconds that an inactive connection can remain in the connection pool before it is closed and removed from the connection pool. The startup retry parameter corresponds to the number of times that the resource adapter should attempt to initialize the connection pool at startup if the initial attempt fails. The backoff timeout parameter is the number of seconds that the system should wait between attempts to initialize the connection pool. Preferably the parameters remain the same for all connection pools in the cluster. However, it is also conceivable that different connection pools may have different parameters. For instance, there might be connection pools for specific tasks, e.g., backup connection pools. Other connection pools may be specifically directed to serve connections known to be problematic, complex or difficult and thus have, e.g., different time out values than other connection pools and/or clusters of connection pools. Such specific connection pools could also be comprised in specific clusters. For instance, in an embodiment there could be several clusters of connection pools, wherein one cluster could serve as main cluster while another serves as backup cluster. The backup cluster could allow for a faster re-establishment of connections upon failure of the main cluster.

The design of the connection pool cluster coordinator and the connection pools according to an embodiment of the present invention is also illustrated in FIG. 3. Therein the connection pool cluster coordinator 300 intercepts and distributes all incoming connection requests 310a to 310d and distributes them to the respective connection pools 320a to 320d. With this design, multiple threads can get access to connection objects concurrently and consequently establish connections between the EIS and the one or more client applications more efficiently.

For instance, instead of implementing one large pool of a maximum of 200 connections (which could serve only one connection request at a time), in an embodiment of the present invention there could be a cluster of 20 small connection pools, each comprising 10 connection objects. In this way it would be possible to serve up to 20 connection requests simultaneously.

The connection pool cluster coordinator adds very little overhead because it is responsible for co-ordination among relatively small connection pools. This additional time may just be a fraction of second. Thereafter the connection request will be assigned to a connection pool. In one embodiment, all the connection pools in cluster can have a common thread to clean up unused connections.

In the following, a method 400 for establishing a connection between an EIS and at least one client application in accordance with an embodiment of the present invention will be described with reference to FIG. 4. The method starts with a request by the client for a connection 410 to the EIS. The cluster coordinator 420 is the gateway to get a connection object. The cluster coordinator first checks 430 the connection pool health registry which contains all the registered connection pools. Herein it first checks for the one or more connection pools which already have connection objects available (so that no new connection object has to be created). Upon finding a suitable connection object in one or more connection pools, the cluster coordinator gets handle to the corresponding connection pool manager. There may be a single connection pool manager for all connection pools. Also, there may be a single connection pool manager for a cluster of connection pools. However, the responsibility of a connection pool manager may be independent of a certain cluster or of connection pools. Thus, there may be any suitable number of connection pool managers. In any case, it is the responsibility of the connection pool managers to update the connection pool health registry with the status quo of all of the registered connection pools. Not all existing connection pools need to be registered at any time. In case there is no registered connection pool with available connection object, in one embodiment the cluster coordinator would then check for the connection pool which has the capacity to create more connection objects. Since each of the connection pools have a maximum cap on the number of connections that can be created, the connection pool manager will be able to create a new connection object only if this maximum is not reached. In order to achieve the foregoing, the cluster coordinator checks the connection pool health registry (explained in more detail below) for a handle to a suitable and/or responsible connection pool manager. The connection pool manager will then 440 either create a new connection object or pass on 460 the handle for an existing connection object. Based on the check made in step 430, it will update 450 the connection pool health registry. The cluster coordinator can in this way cater to multiple connection requests by delegating to the underlying connection pool managers.

In order to provide for an optimal utilization of the multiple connection pools, in an embodiment the invention comprises the connection pool health registry. This connection pool health registry maintains the status quo of all the connection pools. It holds information about available connection objects and the status of each of the connection pools and/or the one or more clusters. Hence, when there is a request for a connection object, rather than creating a new connection object, available connection objects can be passed on. The connection pool health registry further comprises information about the number of possible connections objects of the connection pool. If the connection pool has already reached the maximum number of connection objects it is allowed to create, no new connection object will be created in that connection pool. The information provided by the connection pool health registry helps in picking the connection pool which still has scope of creating more connection objects.

As already explained, in an embodiment, resource adapters mediate the interaction of client applications which need to integrate with an EIS. To this end, the resource adapter exposes one or more APIs (Application Programming Interface) which comprise the implemented functionality (such as connection management, making service calls etc). In an embodiment, the structure of the resource adapter might not be known by the client applications or the EIS. The client applications and the EIS communicate with the resource adapter which internally controls the connection objects. Thus, from the perspective of the client applications and the EIS the communication with the resource adapter does not change as compared to the resource adapter known from the prior art. However, it is also conceivable that the client applications and/or the EIS know about the internal structure of the resource adapter, e.g., with respect to the connection pools, or clusters of connection pools. Depending on the circumstances either solution may improve the operation of the resource adapter and consequently the integration of the client applications and the EIS.

According to an embodiment, at design time of the resource adapter the user building the resource adapter shall pass on at least some of the following information. Factory design pattern (which is a general re-usable solution to a commonly occurring problem within a given context in software design. The factory method pattern is a standard object-oriented design pattern.), which is used in the creation of connection pools, EIS related information, Minimum Pool Size, Maximum Pool Size, Pool Increment Size, Block Timeout (msec), Expire Timeout (msec), Pool size of smaller chunks of connection pool (this property will be the basis on which the number of connection pools is decided). As used herein, the minimum pool size is the minimum number of connection objects that remain in the connection pool at all times. When the adapter creates the pool, it creates this number of connections. The maximum pool size is the maximum number of connection objects that can exist in the connection pool. When the connection pool has reached its maximum number of connections, the adapter will re-use any inactive connections in the pool or, if all connections are active, it will wait for a connection to become available. The pool increment size specifies the number of connections by which the connection pool will be incremented if connections are needed, up to the maximum pool size. The block time out specifies the number of milliseconds that the resource adapter will wait to obtain a connection with the EIS before it times out and returns an error. The expire timeout specifies the number of milliseconds that an inactive connection can remain in the pool before it is closed and removed from the pool. The startup retry defines the number of times that the resource adapter should attempt to initialize the connection pool at startup if the initial attempt fails. The backoff timeout is the number of seconds that the system should wait between attempts to initialize the connection pool.

The resource adapter may be implemented in Java, but other programming languages are also conceivable. From the perspective of the programming language, e.g., Java, the following could be the main actors (e.g., Java classes) in implementing the framework in accordance with an embodiment of the present invention:

The class "ClusterCoordinator": This class has one or more APIs to be called by the client applications requesting for connection objects. It acts not only as the casing of the framework, but also plays pivotal role in delegating the creation of connection objects via multiple connection pools and optimizing the performance. It retries connections from the corresponding pools based on the "ClusterRegistry" (explained below). The following pseudo code is an example for the class "ClusterCoordinator" according to an embodiment of the present invention.

```
public class clusterCoordinator {
private ConnectionPoolManager cpm;
private ClusterResgistry cRegistry;
getConnectionPool( ){
//This method checks the ClusterRegistry for a
// connection pool with
//connections. The absence of such a connection pool
//will in one
// embodiment result in passing on the onus of
//creation of the
// connection to a connection pool with the least
//number of connections
// already created.
}
getConnection(ConnectionPool cPool){
return cPool.getConnection( );
}
}
```

According to an embodiment, the function "getConnection" can be represented in pseudo code as follows:

```
synchronized void getConnection( ){
// This is the part of code wherein a check on the
// health stats is made. Then connections are either
// created or provided from the available connection
// pool based on the availability. This step is
// synchronized to make sure the handle is provided
// to only one thread.
}
```

The class "ConnectionPoolManager": This class handles the creation of connection pools based on the user configuration. For instance, if the user wants to create a pool of 200 connections, internally the connection pool manager will create 10 pools of 20 connection objects each for faster creation and response time to cater to the connection request. In this example, it is one cluster of 10 connection pools. Each connection pool can have a maximum of 20 connection objects. The connection pools and the cluster are part of the resource adapter. In one embodiment, it also does a chron job of checking on the health of these connection pools and taking appropriate actions, such as destroying inactive connections, or creating more connections based on request from clients. The scheduling of the chron jobs may depend on the specific requirements and may be different for each connection pool and/or each cluster of connection pools. The following pseudo code is an example for the class "ConnectionPoolManager" according to an embodiment of the present invention.

```
public class ConnectionPoolManager {
//Maintains a list of connection pools created.
ArrayList<ConnectionPool> cpList= new
ArrayList<ConnectionPool>( );
//this is a cron job to keep cleaning the connection
// pools with any inactive connections and then
// updating the health registry.
updateClusterRegistry( )
//creates connection pools based on the configuration
// using "Factory Pattern"
createPools(ConnectionFactory factory){
//iteration to
cpList.add(new ConnectionPool(factory))
}
```

The class "ConnectionPool": in one embodiment, this class will eventually hold the final code which is synchronized (thread safe), for creating/destroying of the connections based on the "Factory Design Pattern". In more detail, the Java language and the JVM (Java Virtual Machine) have been designed to support concurrent programming, and all execution takes place in the context of threads. Objects and resources can be accessed by many separate threads; each thread has its own path of execution. Thread synchronization ensures that objects are modified by only one thread at a time and that threads are prevented from accessing partially updated objects during modification by another thread. The Java language has built-in constructs to support this coordination. It also holds the information, which is updated periodically, of the health of the one or more connection pools. In one embodiment, this may comprise the statistics of the connection objects in use, available connections and other suitable parameters. The following pseudo code is an example for the class "ConnectionPool" according to an embodiment of the present invention.

```
public class ConnectionPool {
private HealthStats _healthStats = null;
ConnectionPool(factory){
initialiseConnection(factory);
}
```

The class "HealthStats": this class is a container for holding the pool health, i.e., in one embodiment it comprises at any point in time details about the available connection objects, and how much the connection pool can be stretched. In one embodiment, each connection pool will have an instance variable of the same and is updated periodically or as a result of a certain action after serving any request for a connection object. The following pseudo code is an example for the class "HealthStats" according to an embodiment of the present invention.

```
public class HealthStats {
// Created and available to be picked up
private int AVAILABLE_CONNECTIONS;
// Total number of connection objects created so far
private int TOTAL_CONNECTIONS_CREATED;
// This corresponds to the connection objects which
// can be created
private int YET_TO_CREATE;
// Maximum connections that can be created in this
// pool
private int MAX_POOL_SIZE;
...
}
```

The class may comprise corresponding getter setter methods, which are used to retrieve and manipulate private variables in a different class. A "getter" method retrieves the attribute of the same name. A "setter" method allows to set the value of the attribute. The getter setter methods are used to keep updating these variables pertaining to a particular connection pool. The following pseudo code shows an example, how the health stats could actually be retrieved in accordance with an embodiment of the present invention.

```
public HealthStats get_healthStats( ) {
// will return the current health stats of the
// connection pool,which is used by the connection
// pool manager so as to pick a connection pool
// based on the load in each of these pools, a
// Registry is maintained to make this
// information central.
}
```

The class "ClusterRegistry": This class contains a hashmap of the connection pools and their corresponding pool health stats. The connection pool manager keeps updating the cluster registry and the cluster coordinator can pick up on a connection pool manager based on the logic of which connection pool is least loaded and can serve the request faster. The classes "HealthStats" and "ClusterRegistry" together form the health registry. The following pseudo code is an example for the class "ClusterRegistry" according to an embodiment of the present invention:

```
public class ClusterRegistry {
HashMap hRegistry=new HashMap( );
public void updateRegistry(ConnectionPool cPool){
hRegistry.put(cPool, cPool.getHealthStats);
}
```

The class "ConnectionFactory": This class may hold part of or all of the configuration information related to the connections to be made by using the connection objects. This configuration information may comprise capturing details, visual backend details, minimum and maximum connection pool size, time out and any other suitable information. When creating smaller chunks of connection pool, e.g., when clustering the connection pools into smaller portions, the total number of above parameters may be split across all of them. In one embodiment, the user can be given handle to this by making this chunking a configurable property. However the splitting may also be determined by the resource adapter according to some advantageous algorithm. The following pseudo code is an example for the class "ConnectionFactory" according to an embodiment of the present invention.

```
public class ConnectionFactory {
//db related information
private String datasourceClass = new String("");
private String transactionType = new String("");
//DataSource properties
private String user= new String("");
private String password= new String("");
private String serverName= new String("");
private String networkProtocol= new String("");
private String portNumber = newString("");
private String databaseName= newString("");
private String otherProperties= new String("");
private int MIN_SIZE;
private int MAX_SIZE;
private int TIMEOUT;
private int SUB_POOLS_NUMBER;
}
```

The following is pseudo code illustrating how a connection could be initialized in accordance with an embodiment of the present invention:

```
public void initialiseConnection(ConnectionFactory
cFactory){
// This is useful in initialising the initial set
// of connections and maintaining them based on
// the configured connection information.
}
```

In one embodiment, the following pseudo code could represent a connection.

```
public class AdapterConnection {
private ConnectionPool homePool=null;
private boolean inUse=false;
/*
* Initializes a connection immediately after it is
* created for the first time.
* This method will be invoked during the creation of
* a new connection
*
*/
protected void initializeConnection ( ){
//would contain EIS specific API calls to create the
//channel. creates the
//connection and is associated to a connection pool.
}
public void logEvents( ){
//this method would be used to log all the
//information related to the activities
//this connection object perform
}
public void setInUse( ){
inUse=true;
}
//following are sample operations that the client can
//invoke on the EIS via the adapter
//these operations are EIS dependent
public Object getData( ){
//API calls to fetch data from the EIS via this
//connection object
}
public void putData( ){
//api calls to PUT data into the EIS
}
public void deleteData( ){
//based on some filter criteria, data can be
//selectively deleted in the EIS
}
}
```

It is to be understood that above pseudo code is not the only way to implement the solution of the present invention. Moreover, not all of the above classes are necessarily required to implement the invention. Also, additional classes, functions or code may be needed for an implementation of the present invention. The above pseudo code is merely thought to describe the principle of the present invention in accordance with one or more embodiments. Moreover, the code may depend on the respective executive information system that is used.

It has already been described above that the approach of certain example embodiments of the invention improves the connection management between client applications and EIS. This is illustrated with reference to FIG. 5 which illustrates an example of the connection requirement versus time according to prior art (i.e., the curve 500), i.e., as prescribed by the Java Connector Architecture (JCA), and according to an embodiment of the present invention, i.e., curve 510. According to prior art, only one connection pool is used. As explained above, this represents a bottleneck in case of multiple simultaneous connection requests: Since only one thread may be processed at a time, establishing all connections takes substantially longer as compared to prior art which allows to utilize multiple connection pools at a time by employing a cluster coordinator. As the load increases, i.e. the number of operations increases, the requirement for connection objects does also increase.

When a connection is required, the connection object is fetched from the connection pool and once the operation is completed the connection object returns back to the connection pool, i.e., it is unloaded. The connection pool has the inherent mechanism to destroy the connections which are idle for a long time. This is done by the cluster coordinator. However, the properties of the destruction of an existing connection and whether the destruction of an existing connection is necessary at all may be configured.

With respect to FIG. 5, communication starts at time t1 and the number of required connections keeps rising until 50 at time t3. This scaling up primarily occurs due to heavier loads/throughput wherein more connections are needed. Hence it can be seen that for the system to reach the state of 50 connections the time required is t3−t1. The number of connections remains at peak utilization till time t4 and starts to decline (as the load is decreasing). For instance, this kind of throughput increase and decline may be observed in cases such as an e-commerce site wherein the activity due to purchase orders is greater during the daytime than during nighttime.

The system now has to unload the connection objects back to the connection pool. With only one thread being responsible for the management of the connection objects, i.e., according to prior art, the time the system needs to reach the required peak level (and vice versa to unload connection objects), the connection pool requires more time than compared to the solution of certain example embodiments of the present invention.

As can also be seen from the graph of FIG. 5, the system according to an embodiment of the present invention can reach the peak utilization by time t2 (cf. reference sign 510), which is clearly faster than the prior art solution. The same is the case for the unloading of the connections back to the connection pool, which is also substantially faster than the prior art solution. Thus, the solution of certain example embodiments of the present invention results in greater efficiency as compared to the solution known from prior art.

It will be appreciated that as used herein, the terms system, subsystem, service, engine, adapter, module, programmed logic circuitry, and the like may be implemented as any suitable combination of software, hardware, firmware, and/or the like. For instance, these elements may include hardware processing resources (such as, for example, at least one processor and a memory) and/or may operate on computer systems including processing resources that cooperate to execute such components. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

What is claimed is:

1. A processing system comprising:
a memory;
at least one processor communicably coupled to the memory; and
a resource adapter configured in the memory to establish connections between an executive information system (EIS) and one or more clients, the resource adapter comprising:
at least a first and a second connection pool configured in the memory, each maintaining a plurality of connection objects, wherein each connection object defines a channel of communication between the EIS and the resource adapter, and wherein each connection object is identifiable as to whether or not it is currently assigned to a client;
at least one connection pool manager configured to, using the at least one processor, (1) update a connection pool health registry stored in the memory with current information regarding health of the first connection pool and the second connection pool, and (2) in response to a request from the cluster coordinator, assign a connection object from the first connection pool or the second connection pool, and accordingly update the connection pool health registry; and
a cluster coordinator configured to, in response to each of a plurality of requests from the one or more clients and using the at least one processor, (1) determine a preferred connection pool based upon the connection pool health registry, (2) when the determined preferred connection pool is the first connection pool, request the at least one connection pool manager to assign to the one or more clients a first connection object by selecting from connection objects in the first connection pool that are currently not assigned to any client, and (3) when the determined preferred connection pool is the second connection pool, request the at least one connection pool manager to assign to the one or more clients a second connection object by selecting from connection objects in the second connection pool that are currently not assigned to any client, to establish at least two coexisting connections between the one or more clients and the EIS.

2. The processing system according to claim 1, further comprising a connection pool manager configured to, in response to the requests from the one or more clients, create one more new connection objects in the first connection pool when it is determined that the first connection pool does not have at least one connection object that is currently not assigned to any client.

3. The processing system according to claim 2, wherein a new connection object is created using a connection factory.

4. The processing system according to claim 2, wherein the connection pool manager is further configured to modify or delete connection objects in the at least two connection pools.

5. The processing system according to claim 2, wherein the at least one connection pool manager is further configured to destroy inactive connections to release the corresponding connection objects.

6. The processing system according to claim 1, wherein the resource adapter is further configured to assign several connection objects to a single client.

7. The processing system according to claim 1, further comprising at least one cluster, wherein each cluster comprises at least two connection pools.

8. The processing system according to claim 1, wherein the determining a preferred connection pool is based upon a health status of the preferred connection pool comprising information about available connection objects.

9. The processing system according to claim 1, further comprising:
the connection pool health registry configured to monitor the status of at least one of the connection pools,
wherein the at least one connection pool manager is configured to create one more new connection objects in the at least two connection pools.

10. A computer system comprising the processing system of claim 1 and the EIS.

11. The processing system according to claim 1, wherein the cluster coordinator is further configured to assign the second connection object to a second one of the clients at least in part concurrently with assigning the first connection object to a first one of the clients.

12. The processing system according to claim 1, wherein the assigning comprises providing to the one or more clients a first handle to the first connection object and a second handle to the second connection object.

13. The processing system according to claim 1, wherein the cluster coordinator is further configured to, when at least one of the two coexisting connections is no longer active, make the corresponding one of the first connection object or the second connection object available for assigning to the one or more clients.

14. A method for establishing a connection between an executive information system (EIS) and at least one client, the method comprising:
providing at least a first and a second connection pool in a memory communicably coupled to a processing system, each maintaining a plurality of connection objects, wherein each connection object defines a channel of communication between the EIS and a resource adapter, and wherein each connection object is identifiable as to whether or not it is currently assigned to a client;
providing at least one connection pool manager configured to, using the at least one processor, (1) update a connection pool health registry stored in the memory with current information regarding health of the first connection pool and the second connection pool, and (2) in response to a request from the cluster coordinator, assign a connection object from the first connection pool or the second connection pool, and accordingly update the connection pool health registry; and
providing a cluster coordinator configured to, using the processing system and in response to each of a plurality of requests from the one or more clients, (1) determine a preferred connection pool based upon the connection pool health registry, (2) when the determined preferred connection pool is the first connection pool, request the at least one connection pool manager to assign to the one or more clients a first connection object by selecting from connection objects in the first connection pool that are currently not assigned to any client and (3) when the determined preferred connection pool is the second connection pool, request the at least one connection pool manager to assign to the one or more clients a second connection object by selecting from connection objects in the second connection pool that are currently not assigned to any client, to establish at least two coexisting connections between the one or more clients and the EIS.

15. A non-transitory readable storage medium tangibly storing a computer program comprising instructions configured to perform the method of claim 14.

16. A method for establishing a connection between an executive information system (EIS) and at least one client, in connection with a resource adapter running on a computer system including processing resources comprising at least one processor and a memory, the method comprising:
maintaining a plurality of connection objects in each of at least first and second connection pools formed in the memory, each connection object defining a channel of communication between the EIS and the resource adapter;
in connection with at least one connection pool manager, using the at least one processor, (1) updating a connection pool health registry stored in the memory with current information regarding health of the first connection pool and the second connection pool, and (2) in response to a request from the cluster coordinator, assigning a connection object from the first connection pool or the second connection pool, and accordingly updating the connection pool health registry; and
in connection with a cluster coordinator of the resource adapter and in response to each of a plurality of requests from the at least one client, (1) determining a preferred connection pool based upon the connection pool health registry, (2) when the determined preferred connection pool is the first connection pool, requesting the at least one connection pool manager to assign a first connection object by selecting from connection objects in the first connection pool that are currently not assigned to any client, and (3) when the determined preferred connection pool is the second connection pool, requesting the at least one connection pool manager to assign to the one or more clients a second connection object by selecting from connection objects in the second connection pool that are currently not assigned to any client, to establish at least two coexisting connections between the one or more clients and the EIS.

17. A non-transitory readable storage medium tangibly storing a computer program comprising instructions configured to perform the method of claim 16.

* * * * *